(12) United States Patent
Vogl

(10) Patent No.: US 10,731,785 B2
(45) Date of Patent: Aug. 4, 2020

(54) ANTI-DEBRIS DEVICE FOR COVERING CONNECTORS IN FLUID SYSTEM

(71) Applicant: Dennis A. Vogl, Henderson, MI (US)

(72) Inventor: Dennis A. Vogl, Henderson, MI (US)

( * ) Notice: Subject to any disclaimer, the term of this patent is extended or adjusted under 35 U.S.C. 154(b) by 0 days.

(21) Appl. No.: 16/535,161

(22) Filed: Aug. 8, 2019

(65) Prior Publication Data

US 2019/0360627 A1 Nov. 28, 2019

Related U.S. Application Data

(63) Continuation of application No. 14/870,581, filed on Sep. 30, 2015, now abandoned.

(Continued)

(51) Int. Cl.
*F16L 55/115* (2006.01)
*F16L 57/00* (2006.01)
*F16L 3/00* (2006.01)

(52) U.S. Cl.
CPC .............. *F16L 55/115* (2013.01); *F16L 3/003* (2013.01); *F16L 57/005* (2013.01); *F16L 2201/80* (2013.01)

(58) Field of Classification Search
CPC ... F16L 55/1286; F16L 57/06; F16L 55/1157; F16L 55/115; F16L 57/005; F16L 2201/80

(Continued)

(56) References Cited

U.S. PATENT DOCUMENTS 571,708 A * 11/1896 Thompson ............ F16K 15/141
   137/845
1,150,080 A * 8/1915 Tissue ...................... B65D 7/26
   220/6

(Continued)

FOREIGN PATENT DOCUMENTS

DE 19538118 4/1997

OTHER PUBLICATIONS

Picture #1 is a photograph of a device in prior art, manufacturer unknown, first public use unknown but at least before Oct. 14, 2014, the device (blue color) being a cap for covering an open end of a pneumatic quick connect (silver color).

(Continued)

*Primary Examiner* — David Bochna
*Assistant Examiner* — James A Linford
(74) *Attorney, Agent, or Firm* — Price Heneveld LLP

(57) ABSTRACT

An anti-debris device releasably engages and covers an unconnected end of a fluid-conveying quick disconnect connector to prevent debris intrusion. The device comprises a boot defining a cavity shaped to receive the connector, a connector-receiving access opening to the cavity, and a closure member such as flexible sheet slit to form resilient fingers movable between an opening-covering position preventing intrusion of foreign matter when the boot is not being used, but that flex to a connector-receiving position when an unconnected portion of a connector is biased against the closure member. The fingers assist in retaining the device on the connector. Various embodiments allow retaining the anti-debris device to a particular connector when the device is not in use, and/or for storing/protecting multiple connectors. Related methods are also disclosed and discussed.

7 Claims, 5 Drawing Sheets

Related U.S. Application Data

(60) Provisional application No. 62/063,685, filed on Oct. 14, 2014.

(58) Field of Classification Search
USPC ........ 220/916, 229, 795, 780, 212; 215/228; 285/901
See application file for complete search history.

(56) References Cited

U.S. PATENT DOCUMENTS

| | | | |
|---|---|---|---|
| 2,962,187 A * | 11/1960 | Morris | A45C 11/00 220/780 |
| 3,068,316 A | 12/1962 | Witt | |
| 3,086,674 A * | 4/1963 | Scheuerman | A47G 29/1203 220/229 |
| 3,739,936 A | 6/1973 | Jones, Jr. | |
| 3,899,100 A * | 8/1975 | Rigaud | B65D 51/00 220/229 |
| 4,884,717 A | 12/1989 | Bussard et al. | |
| 4,948,009 A | 8/1990 | Sawatani | |
| 5,025,947 A | 6/1991 | Leone | |
| 5,593,059 A | 1/1997 | Neilson | |
| 6,367,665 B1 | 4/2002 | Barriac et al. | |
| 6,402,407 B1 | 6/2002 | Goldstein | |
| 6,655,656 B2 | 12/2003 | Maldavs | |
| 6,701,982 B1 | 3/2004 | Ortiz et al. | |
| 7,213,611 B2 | 5/2007 | Flynn | |
| 8,302,798 B2 | 11/2012 | Moss | |
| D751,391 S | 3/2016 | Wu | |
| 2008/0196768 A1 * | 8/2008 | Steffan | F16L 55/115 137/232 |

OTHER PUBLICATIONS

Picture #2 is a photograph of a resilient boot in prior art, manufactured by Dorman Products Inc, address unknown, first public use unknown but at least before Oct. 14, 2014, the boot being shaped to plug vacuum ports and cap fluid lines.

Picture #3 is a photograph of a resilient boot in prior art, manufactured by Pioneer company, address unknown, first public use unknown but at least before Oct. 14, 2014, the boot being shaped to cover ½ hydraulic nipples.

Picture #4 is a photograph of a resilient plug in prior art, manufactured by Pioneer company, address unknown, first public use unknown but at least before Oct. 14, 2014, the plug being shaped to cover ½ hydraulic couplers.

* cited by examiner

ANTI-DEBRIS DEVICE FOR COVERING CONNECTORS IN FLUID SYSTEM

CROSS-REFERENCE TO RELATED APPLICATION

The present application is a continuation of U.S. patent application Ser. No. 14/870,581 filed Sep. 30, 2015, entitled ANTI-DEBRIS DEVICE FOR COVERING CONNECTORS IN FLUID SYSTEM, which claims the benefit under 35 USC section 119(e) of U.S. Provisional Application Ser. No. 62/063,685, filed Oct. 14, 2014, entitled ANTI-DEBRIS COVER FOR AIR DISCONNECT IN FLUID SYSTEM, the entire disclosures of which are incorporated herein by reference.

BACKGROUND OF THE INVENTION

The present invention relates to an anti-debris device to prevent dirt and debris from entering the fluid line of hydraulic or pneumatic equipment through an open quick disconnect connector, and more particularly relates to a cover that resiliently slips over a quick disconnect connector to prevent dirt and debris from entering an open passageway into the unattached quick disconnect connector. However, the present invention is not believed to be limited to only hydraulic and pneumatic systems, nor to quick disconnect connectors, but instead is believed to cover any connector in any fluid system, including water, atmosphere-conveying, and other fluid systems.

Many pneumatic and hydraulic systems use quick disconnect connectors as a way to quickly and easily connect and disconnect lines, so that components and/or equipment can be used in other operations, and also so that components can be stored, repaired, or maintained. A problem is that such systems are often used in dirty environments, and concurrently the quick disconnect connectors often get covered with dirt and debris once disconnected. Hydraulic and pneumatic components (particularly actuators, motors and other system components) are highly sensitive to dirt, sand, debris and other foreign matter in the fluid system, since they include highly machined surfaces with tight tolerances that the foreign matter will scratch, score, damage and/or wear out. The problem of dirty and debris-containing environments is well known in agricultural and construction industries. For years, operators connecting a quick disconnect connector have "automatically" wiped off and/or blown off foreign matter on the quick disconnect prior to attachment in an effort to keep the system clean. However, these practices are highly unreliable, very sensitive to operator lack of attention, and even if done, problematic foreign matter may still remain, especially inside the long narrow fluid passageways of the connectors. Notably, even a small amount of foreign matter will accumulate and can contaminate a fluid system, and damage components of the system.

SUMMARY OF THE INVENTION

In one aspect of the present invention, a method of covering part of a fluid-conveying quick disconnect connector to prevent intrusion of dirt and debris, comprises steps of: providing a boot defining a closed cavity with an access opening, and that includes a slit panel of resilient material covering the access opening; flexing the resilient material to a cavity-closed position when unstressed; and flexing the resilient material to a cavity-access-allowing position permitting entry of an unconnected end of a quick disconnect fluid connector into the cavity when the unconnected end is pressed against the panel of resilient material.

In another aspect of the present invention, a method of preventing intrusion of foreign matter into a fluid system, comprises steps of: providing a fluid-conveying quick disconnect connector having a fluid-conveying passageway; providing a boot with a cavity shaped to receive an unconnected end of the fluid-conveying quick disconnect connector, the boot having a closed end, a second end defining a connector-receiving access opening, and a closure member for covering the connector-receiving access opening; and flexing the closure member to an opening-covering position that covers the connector-receiving opening to prevent intrusion of foreign matter into the cavity when the boot is not being used, but flexing the closure member to a connector-receiving position when engaged by the unconnected end so that the foreign matter still will not enter the cavity nor contact the unconnected end of the connector even when the boot comes into contact with debris.

In another aspect of the present invention, an anti-debris device for covering part of a fluid-conveying quick disconnect connector, comprises a boot defining a closed cavity with an access opening, and including resilient fingers that flex to a cavity-closed position when unstressed, but that flex to a cavity-access-allowing position permitting entry of an unconnected end of a quick disconnect fluid connector into the cavity when the unconnected end is pressed against the fingers.

In another aspect of the present invention, an anti-intrusion device for covering a fluid-conveying quick disconnect connector, the connector including a fluid-conveying passageway, comprises a boot defining a cavity shaped to receive an unconnected end of the fluid-conveying quick disconnect connector, the boot defining a connector-receiving access opening, and a closure member normally covering the connector-receiving access opening but being flexibly movable to a connector-receiving position with minimal clearance around the unconnected end and the closure member so that, when engaged, foreign matter will not enter the cavity nor enter a covered portion of the connector.

These and other aspects, objects, and features of the present invention will be understood and appreciated by those skilled in the art upon studying the following specification, claims, and appended drawings.

DETAILED DESCRIPTION OF PREFERRED EMBODIMENT

Figure 1:
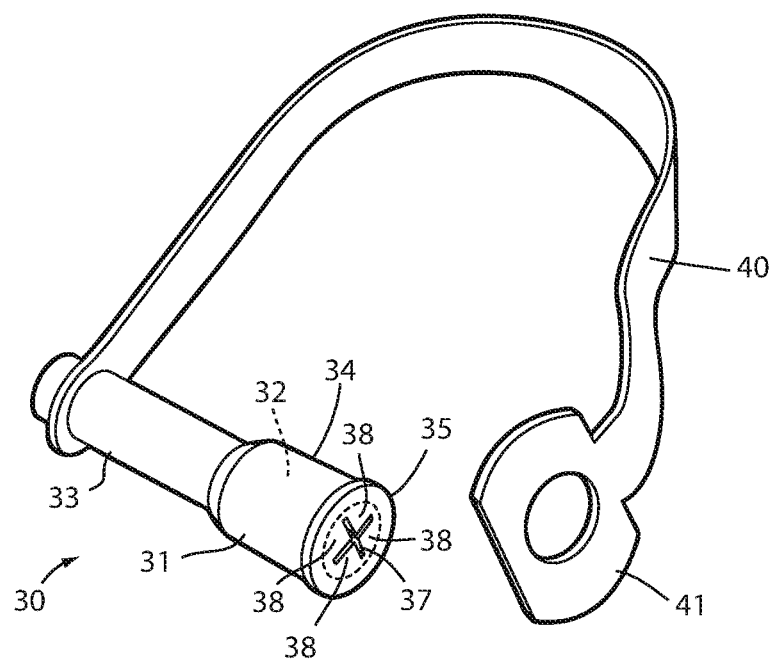
FIG. 1 is a perspective view of the present anti-intrusion device.

The present anti-debris device 30 (also called an "anti-intrusion device" or "debris cover" herein) is provided for releasably covering a fluid-conveying quick disconnect connector 20 on a fluid-using/conveying component 21. Quick disconnect connectors 20 are often used in pneumatic and hydraulic power systems and in related tools and equipment (including the illustrated air wrench). When disconnected, the disconnected end (illustrated as male end 22) has a fluid-conveying passageway 23 that is open, elongated and fairly deep. Connectors 20 are often used in dirty environments, and it is difficult to get all of the dirt off the connectors once it's on the connectors, especially when dirt gets into the connector's internal passageway 23. The present device 30 easily slips onto the unconnected end of the connector, keeping it surprisingly clean even in dirty environments, and even when a hose or tool with the connector is dropped into an unclean area. Further, in one form, the device 30 has a retainer keeping it adjacent the connector, so that the operator does not have to search for the device 30 when disconnecting lines.

Figure 2:
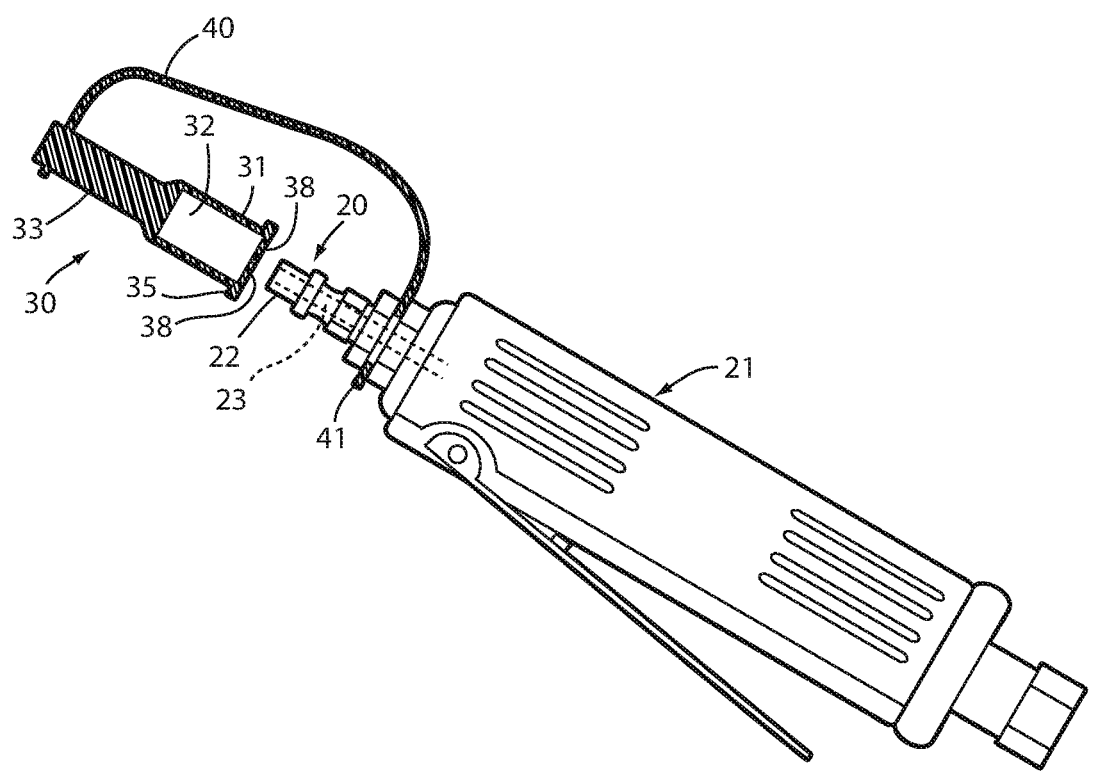
FIGS. 2-4 are side views of a pneumatic wrench component with the device (shown in cross-section) attached to a pneumatic quick disconnect connector on the device, FIG. 2 showing the device disengaged from the male end of the component, FIG. 3 showing the device partially engaged, and FIG. 4 showing the device fully engaged (including the resilient fingers flexing to a position where they seal against the connector and also retain the device on the connector.
Figure 3:
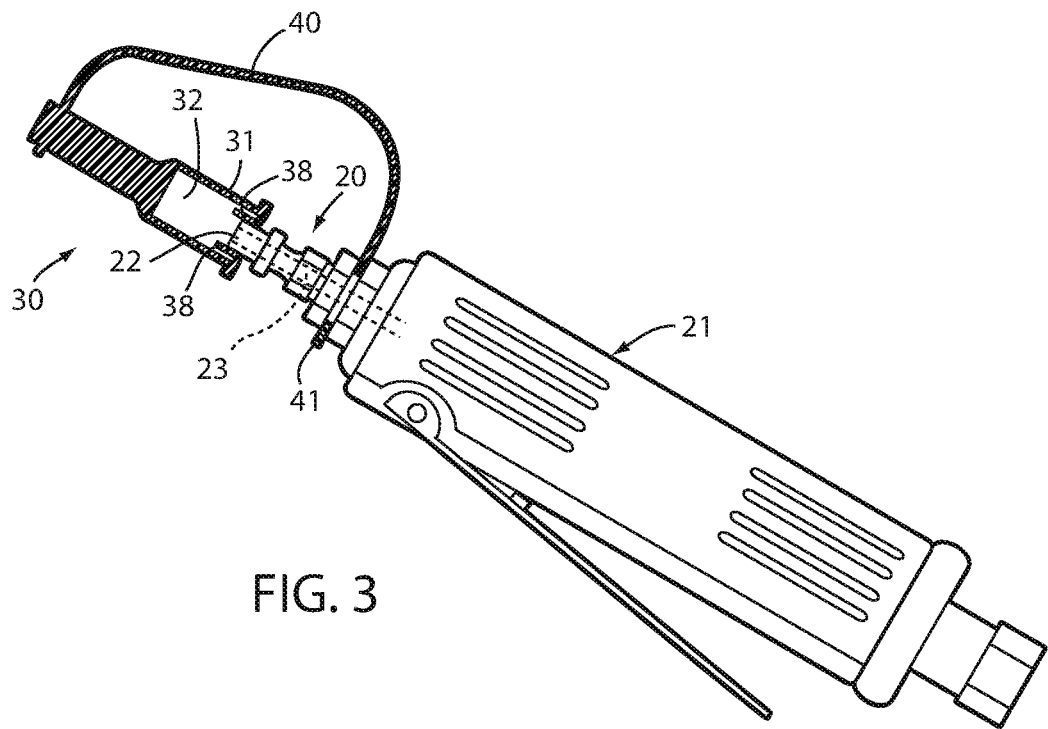
Figure 4:
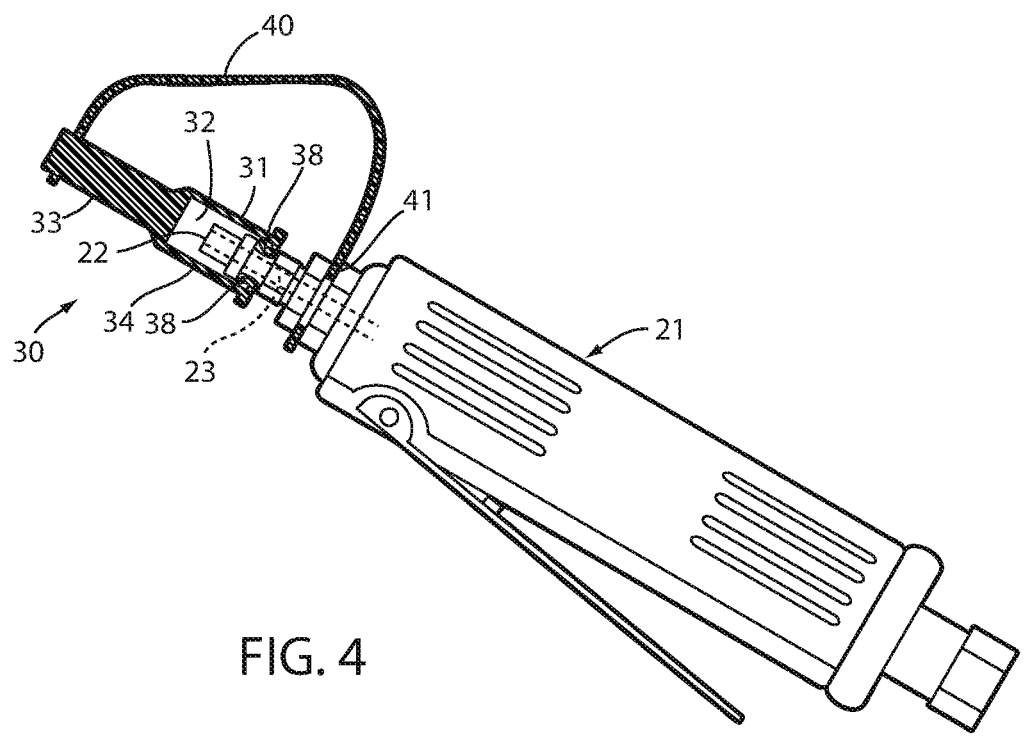

More specifically, the present innovative device 30 comprises a boot 31 defining a closed cavity 32 with a slit 37 (or slits) at one end forming a normally-closed access, but which have inwardly facing flexible fingers that can be biased/flexed out of the way to allow the unconnected portion of the connector 20 to access the cavity 32. The illustrated tethered end 33 is shown as elongated and filled, but it is contemplated that it can be shorter if desired and/or hollow. The illustrated hollow end 34 is covered by a closure member formed by a resilient panel/sheet of material 35 (such as neoprene or rubber or other oil, gas, acid, weather resistant material, and is about $\frac{1}{16}$" thickness or any thickness as needed for good function) attached over one (or both) of the ends 33 or 34, such as by adhesive or other bonding technique. It is contemplated that the panel of material 35 can be attached to the end 34 by different means, such as by adhered attachment, or by being integrally formed with the end 34, or by being part of a nut-like member threaded onto the end 34 (using external or internal threads). The illustrated sheet 35 has slits 37 forming an X-shaped pattern cut through the sheet 35, thus forming four (more or less) inwardly-facing resilient flaps or fingers 38. The fingers 38 naturally move to a co-planar condition when unstressed, where they cover the access opening (FIGS. 1-2). This prevents intrusion of foreign matter when the boot 31 is not being used. The fingers 38 can be flexibly deformed and moved to a connector-receiving position (FIG. 3-4) when an unconnected portion of the connector 20 is pressed against the slit 37, allowing the unconnected portion (i.e. the illustrated male end 22) of the connector 20 to be extended through the slit 37 into the cavity 32 with minimal clearance around the male end 22. Thereafter, the fingers 38 flex to a connector-retaining position where they frictionally engage the covered connector. As illustrated, the fingers 38 flex into an annular recess in the tool's male end, thus providing a very secure frictional retention force. When attached, the unconnected male end 22 of the connector is completely covered so that foreign matter cannot enter the cavity 32, nor can foreign matter coat or enter the connector 20. Further, the male end is held generally in a center of the cavity 32, where it is positioned away from dirt even if some dirt or fluid might enter the cavity. For example, this can be important where water or dirty oil is in the vicinity of where the connector is being disconnected or let lay during storage.

Figure 10:
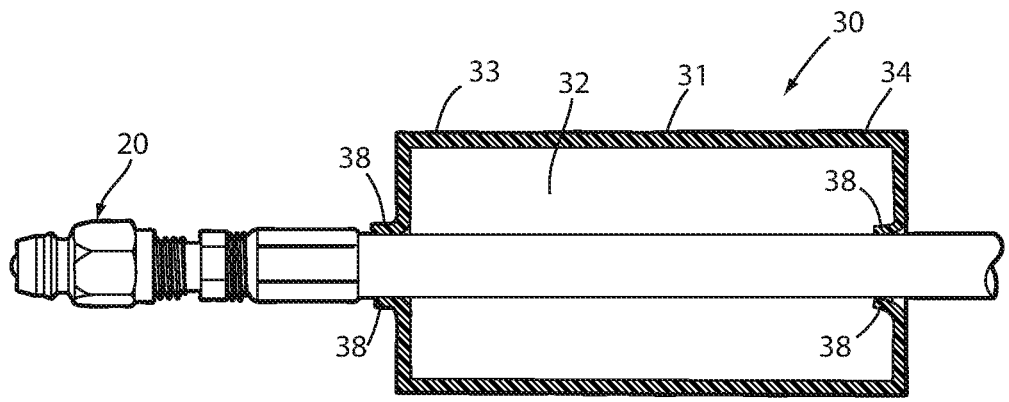
FIGS. 10-12 are cross-sectional views of additional modified anti-intrusion devices.
Figure 11:
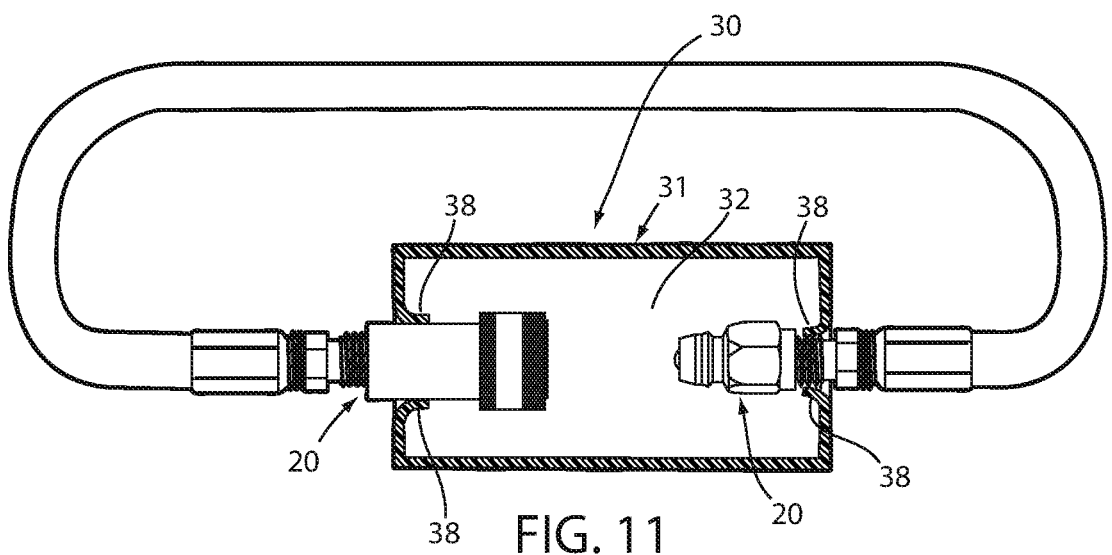

The illustrated device 30 includes an anchoring strap or tether 40 (or spring) that extends from the boot 31 to a retainer 41 (such as a loop) adapted for attachment to the component 21. For example, the illustrated retainer 41 can be resiliently looped around the component 21, such that the device 30 is always immediately readily available for use. It is contemplated that the device (30) can include multiple slit access openings (34) allowing multiple access openings into the single cavity 32 (see FIGS. 10-11), or can include multiple bodies held on a rack and forming a plurality of separate cavities (see FIG. 12), each accessible through a slit access opening. Thus, a single device 30 can be used to protect multiple connectors.

Figure 5:
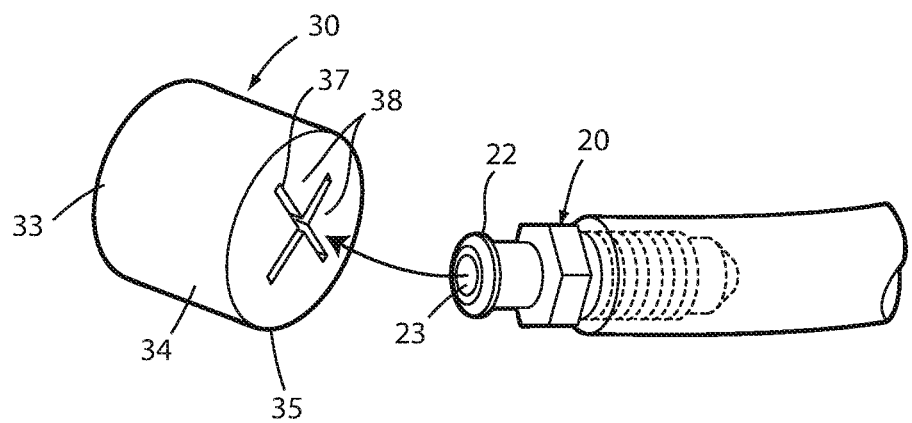
FIGS. 5-7 are exploded, assembled, and cross-sectional views of a pneumatic quick disconnect and a modified anti-intrusion device with flexible fingers covering an access opening to a cavity in the device.
Figure 6:
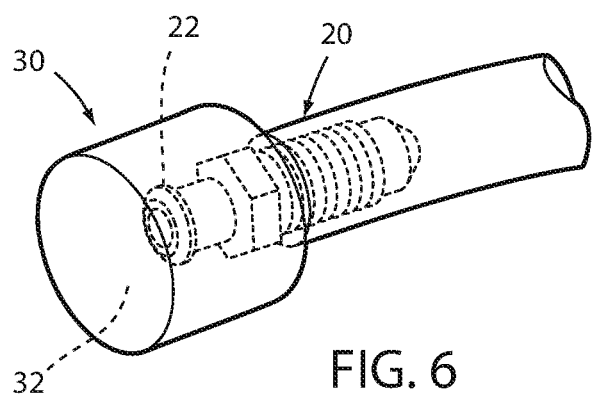
Figure 7:
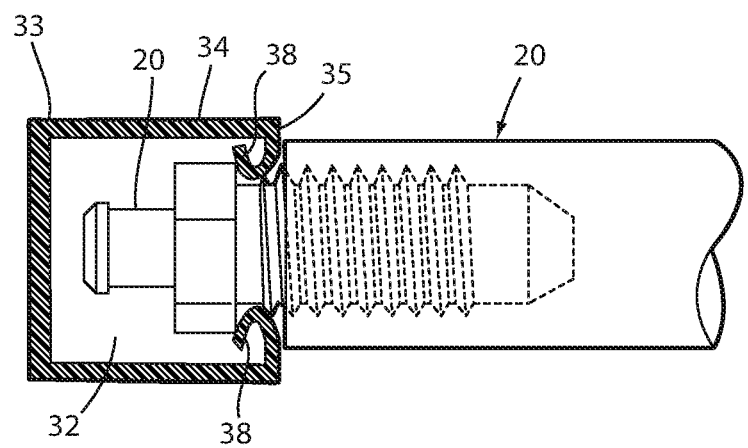
Figure 8:
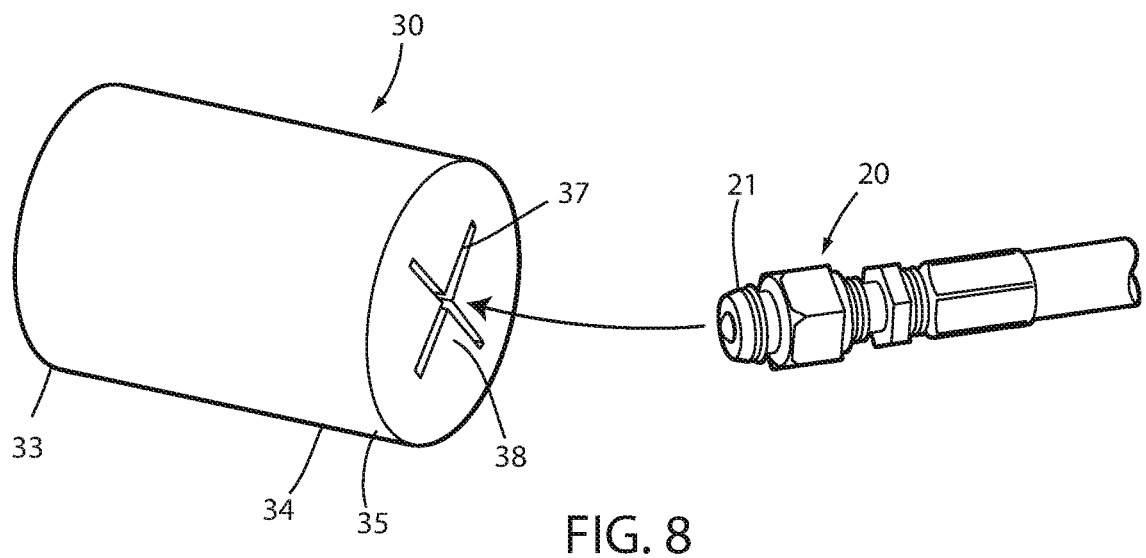
FIGS. 8-9 are exploded and assembled/cross-sectional views of a hydraulic quick disconnect and an anti-intrusion device with flexible fingers covering an access opening to a cavity in the device.
Figure 9:
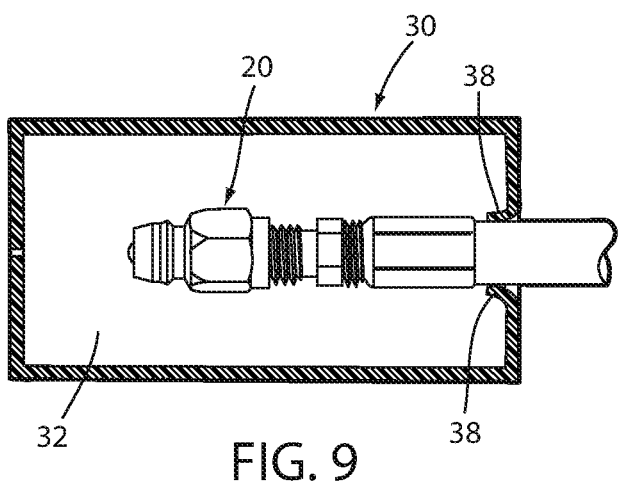

Several modified devices are contemplated. For example, the device can be made elongated, so that a user can cut the device (30) to a selected length optimally suited for a particular use. After being cut to length, the open end would be plugged with a screw or plug or other closure mechanism. The device 30 can be made small for a small connector (see FIGS. 5-7, illustrating a device 30 covering a $\frac{1}{2}$" (or more) diameter air hose and pneumatic connector), or can be made large for a large connector (FIGS. 8-9, illustrating a device 30 covering a 1" (or more) diameter hydraulic hose and hydraulic connector). The device 30 can be made to slip onto a hose of a hose-and-connector combination when not in use (see FIG. 10), thus retaining the device immediately adjacent the connector to avoid the operator having to search for the anti-intrusion device. The device can also be used to protect both quick connectors (i.e. male and female connectors) even when both are on a single extension hose (see FIG. 11).

It will be clear to persons skilled in the art that the boot 31 can have many different shapes, widths, and/or lengths, and be made of many different materials. The illustrated boot 31 (FIG. 1) has a multi-diameter cylindrical shape with a large diameter end and a small diameter end (i.e. shaped much like a spark plug boot for an engine), but it is contemplated that it could be a cylindrical shape of constant diameter (see FIGS. 5-11) or non-cylindrical or another shape (see FIG. 12). Also, the permanently closed end 33 of the boot 31 can be closed by different means. For example, the closed end could be plugged with a rubber or metal plug or screw during manufacture of the boot 31. Alternatively, it could be integrally plugged in an as molded condition during a manufacturing process. The illustrated boot is preferably made of an oil resistance and acid resistant material, such as neoprene, but can be made of any material suitable for an intended use, such as rubber, Viton, or any weather, gasoline, chemical resistant material.

Thus, an anti-intrusion device 30 is provided for covering the unconnected end of a fluid-conveying quick disconnect connector, the male end including a fluid-conveying passageway that may be contaminated with debris that is difficult to remove. The device comprises a boot defining a cavity shaped to receive the unconnected end of the fluid-conveying quick disconnect connector, the boot having a closed end, a second end defining a connector-receiving opening, and a slit panel of resilient material forming a closure member for covering the connector-receiving opening. The slits form fingers movable between an access-opening-covering position covering the connector-receiving opening to prevent intrusion of foreign matter when the boot is not being used, but are movable to a connector-receiving position so that the unconnected end can be extended into the cavity with minimal clearance around the unconnected end so that, when engaged, the foreign matter still will not enter the cavity nor coat or contaminate the connector.

In a narrower aspect, the closure member is made of a resilient planar material such as rubber or neoprene, and includes slits defining multiple inwardly-oriented fingers (2, 3, 4, 6, 8, or more.) that flex out of the way when engaged with the unconnected end of the connector, but that flex back to a covering position when the male end is removed. The fingers can be any shape desired, such as V, U, flap-shaped, or other shape. It is contemplated that some materials can function effectively with only a single slit, and the use of the term "fingers" or "flaps" herein is intended to cover such circumstance.

A related method is provided for preventing intrusion of foreign matter into a quick disconnect of a fluid system. The method includes steps of providing a fluid-conveying quick disconnect connector including an unconnected end having a fluid-conveying passageway; providing a boot with a cavity shaped to receive the unconnected end of the fluid-conveying quick disconnect connector, the boot (30/31) having an end defining a connector-receiving access opening, and a closure member for covering the connector-receiving access opening. The method includes moving the closure member between an opening-covering position that covers the connector-receiving opening to prevent intrusion of foreign matter when the boot is not being used, and includes moving the closure member to a connector-receiving position when engaged by the unconnected end of the connector so that the foreign matter still will not enter the cavity nor contaminate the connector.

Figure 12:
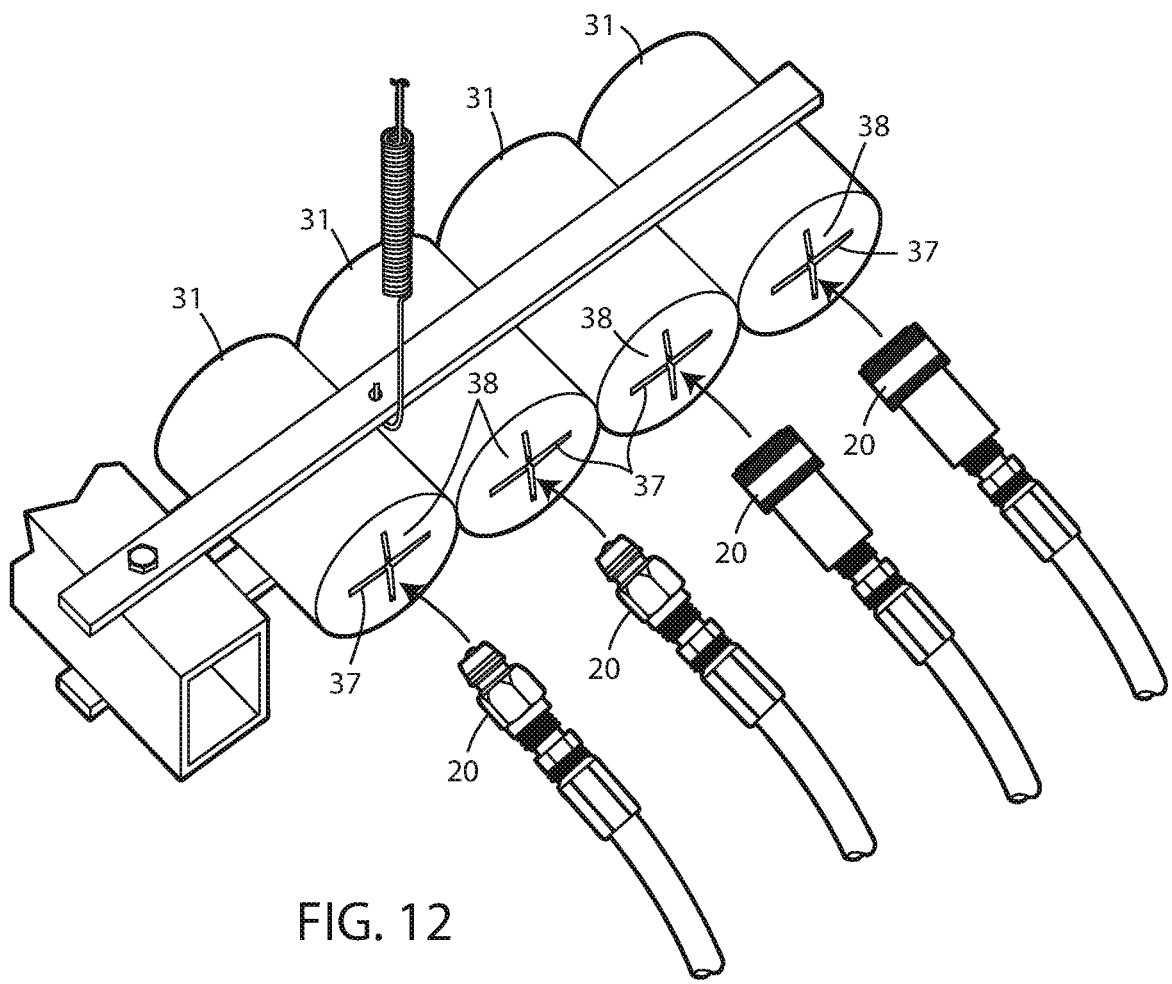

In one form, the device 30 includes a tethering strap extending from the boot with a retainer, such as a loop or clip, for attachment to the connector and/or to the associated working component (FIGS. 1-4). Alternatively, or in addition, the boot may have a plurality of slit-covered access openings to its cavity (see FIGS. 10-12). This allows the device 30 to always be adjacent the component for easy reach and use. For example, the device 30 in FIGS. 10-11 could be placed on a brake line of a vehicle, such as to cover a brake line during a bleed process to remove air from the brake line. Also, the device 30 (or multiple devices 30, FIG. 12) can held by a spring holding it in a close most-accessible position. The spring as illustrated in FIG. 12 supports a bracket holding four devices 30, but it is contemplated that more or less devices 30 can be supported. The illustrated four devices 30 are supported by a tubular beam (or frame) shown on a left end of the illustrated bracket, but it is contemplated that the bracket and/or spring can be used separately or in combination. Also, the bracket can be on equipment (such as a tractor or farm implement) or on a building wall.

It is contemplated that the present device can be useful in many different "dirty" environments, including such places as to cover an exhaust on a tractor, an open end of a shot gun barrel, golf club heads, brake bleeders, and many other places and outdoor locations, especially farm-related ones, and especially on near-the-ground devices likely to encounter loose debris and contaminants.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An anti-debris device for covering part of a fluid-conveying quick disconnect connector, comprising:
a boot being a monolithically formed member with opposing ends and defining a closed cavity with a first access opening within a first end of the opposing ends, and including first resilient fingers that flex to a cavity-closed position when unstressed, the boot including a a cylindrical wall having a uniform diameter over the entire length of the boot, wherein
the first resilient fingers are adapted to flex and curl to a cavity-access-allowing position, the cavity-access-allowing position adapted to permit entry of an unconnected end of the quick disconnect connector into the closed cavity when the unconnected end is pressed against the first resilient fingers;
the boot includes a second access opening within a second end of the opposing ends to the closed cavity and second fingers covering the second access opening;
the clylindical wall and the opposing ends including a uniform cross-sectional thickness;
each of the first and second fingers defining four fingers having the uniform cross-sectional thickness; and
the boot can receive one of the quick disconnect connector through the first and second access openings, and an opposing end of the quick disconnect fluid connector disposed through the second access opening.

2. The anti-debris device in claim 1, wherein the first resilient fingers are shaped to frictionally engage the unconnected end to thus positively retain the boot on the unconnected end.

3. The anti-debris device in claim 1, wherein no part of the anti-debris device enters a passageway defined by the quick disconnect connector.

4. An anti-intrusion device for covering a fluid-conveying quick disconnect connector including a fluid-conveying passageway, comprising:
a boot defining a cavity shaped to receive an unconnected end of the fluid-conveying quick disconnect connector;
the boot being a monolithically formed member having a cylindrical wall having a uniform diameter over the entire length of the boot and opposing first and second ends and comprising:
a first closure member defined within the first end and resiliently defining, a first X-shaped slot that is flexibly movable to define a connector-receiving position that defines a first connector-receiving access opening with minimal clearance around the unconnected end and the first closure member so that, when engaged, foreign matter will not enter the cavity nor enter a covered portion of the quick disconnect connector; and
a second closure member defined within the second end and resiliently defining a second X-shaped slot that is flexibly moveable to define a connector-receiving position that defines a second connector-receiving access opening with minimal clearance around the unconnected end and at least one of the first and second closure members so that, when engaged with the unconnected end, the fluid-conveying quick disconnect connector is positioned through the first connector-receiving access opening and the second connector-receiving access opening and foreign matter will not enter the cavity,
wherein the first and second closure members and the cylindrical wall include a uniform material thickness.

5. The anti-intrusion device in claim 4, wherein the first closure member is made of a resilient panel of material, wherein a plurality of resilient fingers are defined within the resilient panel of material to define the first X-shaped slot.

6. The anti-intrusion device in claim 4, wherein the first closure member is a sheet of resilient material extending across the first end.

7. The anti-intrusion device of claim 6, wherein one or more slits in the sheet define resilient fingers of the first closure member that are inwardly-facing fingers to cover the first end, and wherein the resilient fingers flex and curve out of the way to permit extending the unconnected end of the quick disconnect connector into the cavity but that resiliently flex back to a planar condition to cover the first end when the unconnected end is removed.

\* \* \* \* \*